Figure 1:
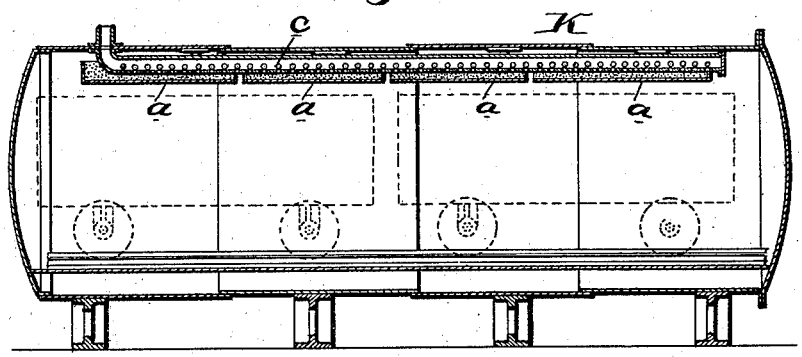

No. 686,333. Patented Nov. 12, 1901.
P. J. PRIOR.
PROCESS OF MAKING ARTIFICIAL STONE.
(Application filed June 30, 1900.)

(No Model.)

Witnesses:
Louis D. Heinrichs

Inventor
Paul J. Prior

UNITED STATES PATENT OFFICE.

PAUL JOSEPH PRIOR, OF COLOGNE, GERMANY, ASSIGNOR TO HEINRICH HUNNEKES, OF STRAELEN, RHINELAND, PRUSSIA, GERMANY.

PROCESS OF MAKING ARTIFICIAL STONE.

SPECIFICATION forming part of Letters Patent No. 686,333, dated November 12, 1901.

Application filed June 30, 1900. Serial No. 22,174. (No specimens.)

*To all whom it may concern:*

Be it known that I, PAUL JOSEPH PRIOR, a subject of the King of Prussia, German Emperor, residing at Cologne-on-the-Rhine, in the Kingdom of Prussia and German Empire, have invented certain new and useful Improvements in Processes of Making Artificial Stone, (for which I have applied for patents in England, No. 9,275, dated May 19, 1900; in Spain, dated May 18, 1900; in Russia, No. 10,051, dated January 20, 1900; in France, No. 284,823, dated January 29, 1900; in Belgium, No. 116,374, dated January 27, 1900; in Sweden, No. 164, dated January 29, 1900; in Norway, No. 12,137, dated January 30, 1900; in Denmark, No. 106, dated January 26, 1900, and in Germany, dated January 16, 1900,) of which the following is a specification.

This invention relates to an improved process of making artificial stone.

The manufacture of artificial stone from sand or equivalent silicious material and slaked lime has usually been effected by subjecting the materials to steam under pressure, either alone or in combination with suitable indurating agents. The use of alkali salts—carbonate of soda or carbonate of potash—as an indurating agent has been proposed; but the satisfactory combination of these salts with the silica to produce uniformity and a maximum degree of hardness has been difficult to accomplish by known methods.

My improvement consists in so applying the salts to the sand and lime in combination with steam that perfect uniformity is obtained and a harder and more efficient product results. To this end I place the alkali salts in exposed pans within the chamber in which the blocks are contained and pass superheated steam under pressure over the surface of the salts on its passage to the blocks. The steam volatilizes the salts and carries them in suspension into the sand and lime. The salts are thus applied to the blocks uniformly throughout and combine more readily with the silica. As a result of the heating of the silica, together with the alkali carbonates, anhydrous alkaline silicate is formed, and consequently potassium and soda water-glass. By further heating under a corresponding pressure the alkaline silicate combines with the lime to form insoluble calcium silicate, and owing to the formation of this silicate the permanence and hardness of the stone are considerably increased, while the percentage of the alkali need only be proportionally inconsiderable.

In the accompanying drawings I have shown an apparatus suitable for carrying out my invention.

Figure 2:
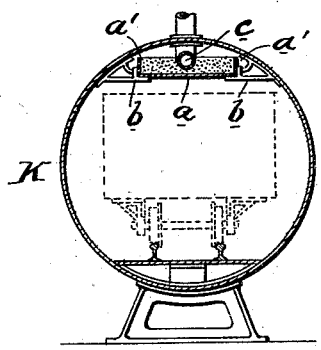

Figure 1 is a longitudinal vertical sectional view of the apparatus, and Fig. 2 is a transverse vertical section of the same.

K is the boiler or containing vessel in which the molds or blocks are introduced. The pans $a$ are supported by suitable guides $b$ and are preferably provided with perforations $a'$ in their sides. The steam-pipe $c$ is perforated and extends longitudinally over the pans. Steam, preferably superheated and under a pressure of from one hundred to one-hundred and fifty pounds, is introduced through the pipe $c$ directly upon the surface of the alkali salts in the pans. Consequently the steam before reaching the mold or block is impregnated with the alkali salts and the block is subjected only to steam so impregnated. Not only are the salts applied more uniformly, but being held in suspension in the steam they react more readily with the silica and lime. Analysis made after this treatment gave in the outer layer of stone a proportion of from .025 to .05 parts, by weight, of potassium silicate in one hundred and seventy parts, by weight, of stone material. The inner layer, on the other hand, yielded a smaller proportion of alkaline silicate.

What I claim as new, and desire to secure by Letters Patent, is—

1. The herein-described method of making artificial stone which consists in first passing steam over a body of alkali salts and thereby impregnating the steam with the said salts and finally subjecting the stone material to the action of said salts-impregnated steam in an inclosing chamber.

2. The herein-described method of making artificial stone which consists in treating a mixture of lime and silicious material to steam impregnated with alkaline salts in suspension.

In testimony whereof I have hereunto set my hand in the presence of two witnesses.

PAUL JOSEPH PRIOR.

Witnesses:
AGNES HERMANNS,
KARL SCHMITT.